United States Patent [19]

Shaw, Jr.

[11] Patent Number: 4,817,255

[45] Date of Patent: Apr. 4, 1989

[54] INSERTION-REMOVAL MONITOR/CONTROL FOR SEAL CARRIER MANUFACTURE

[76] Inventor: Howard C. Shaw, Jr., 700 Wyndwicke Rd., St. Joseph, Mich. 49085

[21] Appl. No.: 122,770

[22] Filed: Nov. 19, 1987

[51] Int. Cl.$^4$ ............................................. B21B 15/00
[52] U.S. Cl. ........................................ 29/33 R; 73/9; 264/40.1; 425/113; 156/378
[58] Field of Search ................... 29/33 R, 33 D, 33 S; 264/40.7, 40.1; 156/378, 500, 501; 425/140, 113; 73/9

[56] References Cited

U.S. PATENT DOCUMENTS

| | | | |
|---|---|---|---|
| 3,488,682 | 1/1970 | Walters et al. | 73/9 X |
| 3,914,356 | 10/1975 | Dembiak et al. | 425/140 X |
| 4,244,897 | 1/1981 | Moon | 425/140 X |
| 4,394,338 | 7/1983 | Fuwa | 425/113 X |
| 4,552,520 | 11/1985 | East et al. | 72/262 X |
| 4,740,336 | 4/1988 | Connen et al. | 264/40.1 |

Primary Examiner—Eugene R. LaRoche
Assistant Examiner—Seung Ham

[57] ABSTRACT

An apparatus and method for monitoring the relationship between the sidewalls of a carrier for a seal. A probe engages the sidewalls and responds to the frictional resistance to movement of the carrier with respect to the probe. If the frictional resistance is outside a preselected resistance, an indicator informs an operator of an out of tolerance condition needs to be corrected in order to manufacture a carrier with insertion and removal characteristics required to retain the seal on a projection surrounding a opening.

7 Claims, 2 Drawing Sheets

INSERTION-REMOVAL MONITOR/CONTROL FOR SEAL CARRIER MANUFACTURE

This invention relates to a method of monitoring the relationship between first and second sidewalls of a carrier member for a seal. Extruded seals have been manufactured for many years. Initially extruded seals had a single flap member with a bulb attached thereto. The flap was fixed between two members to position the bulb such that when another member engaged the bulb a seal was produced even though surface irregularities were present on the members.

In an effort to reduce the cost of installation of the seal, a second flap was added to the bulb. The first and second flap were reinforced by a metal member and rolled into a U-shape. The U-shaped member called a carrier is designed to be pushed over a projection surrounding an opening such as an automobile door or trunk lid to position the bulb seal. The U-shape is designed with internal gripping fingers to be easily pushed over the projection and difficult to remove. During manufacture of the seal if an appropriate relationship is not maintained between the several components of the U-shaped carrier member it cannot be readily installed if the spatial relationship is too tight, or it will not be retained if the spatial relationship is too loose. Various means have been tried to regulate the manufacture of the extruded carriers. The most common method is to measure off-line the internal distance between the sidewalls of the carrier and either increase or decrease the extrusion rate, or manipulate the rollers that form the U-shaped carrier. Unfortunately, there are several variables which simultaneously effect the insertion-removal characteristic of the carrier. Heretofore, on-line measurement apparatus has not been practical. Unfortunately, by the time an off-line measurement is made, hundreds of feet of scrap material may be produced, and even more scrap may be produced via trial and error adjustments until the carrier parameters are again in the acceptable range, and there is no assurance that an acceptable product is produced between off-line samples.

I have discovered that the frictional resistance of a completely formed carrier with respect to a probe can be monitored and equated to the insertion and removal force of a carrier for a seal on a projection. In this invention, the carrier is pulled over a probe and the engagement of the internal sidewalls with the probe creates a deflection (linear, torque, or bending) which through a strain cage is converted into an electrical signal. The electrical signal is fed to a system which is designed to inform an operator or automatic control system of a change in the relationship between the carrier and the probe. On being informed of change, the operator may modify the operation of the extruder to increase or decrease the amount of rubber fed through the extrusion die and placed on the metal insert, or the operator may manipulate this roller position which forms the metal insert into the final U-shape, in order to maintain the proper torque value.

In an automatic control system the signal from the transducer automatically controls the variables to maintain the carrier parameters within set limitations.

It is an object of this invention to provide a method for on-line monitoring of the parameters of a carrier for a seal, to inform an operator or automatic control system of an out of tolerance condition which could effect the insertion and removal of the carrier on a projection to reduce the amount of scrap.

It is another object of this invention to provide a monitor for an extruder to inform an operator of an out of tolerance condition that would adversely effect the insertion and removal characteristics of a carrier from a projection surrounding an opening.

An advantage of this invention is the savings that can be achieved by maintaining the insertion-removal characteristic of a carrier for a seal within set tolerances to reduce the scrap rate of manufacturing.

A further advantage of this invention occurs through the measurement of a resistive force required to move a carrier with respect to a probe connected to a transducer. The resistance force being equated to an insertion and removal retraction force for installing a seal on a projection.

These objects and advantages should be apparent from reading this specification while viewing the drawings wherein.

Figure 1:
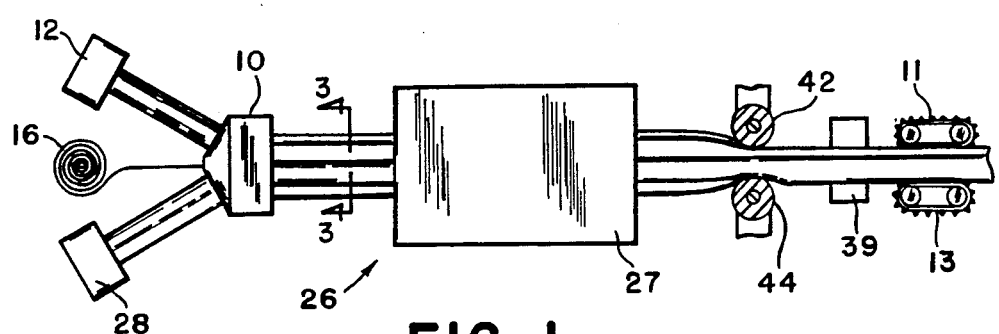
FIG. 1 is a schematic illustrations of an extrusion process to produce a seal having a metal backed carrier.
Figure 2:
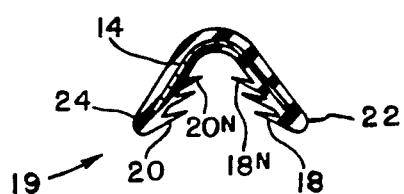
FIG. 2 is a sectional view of the carrier for the seal.

An extrusion apparatus 26, schematically shown in FIG. 1, has a first supply of rubber 12 that is forced into a co-extrusion die chamber 10 and extruded around a steel or metal insert 14 that is drawn from a roll 16 to produce a carrier member 19 as shown in FIG. 2. Carrier member 19 has a series of fingers or ribs 18, 18' ... $18^N$ and 20, 20' ... $20^N$ that are formed on the inside of arms 22 and 24. The thickness of the rubber around the metal insert 14 is controlled by the die, the speed at which the metal insert 14 is pulled through the extrusion die, and the operational pressure of the rubber extruder. Controls on the extrusion line apparatus 26 can be adjusted to speed up or slow down the feed of the metal coil 16 or speed up or slow down the extruder 12.

Figure 3:
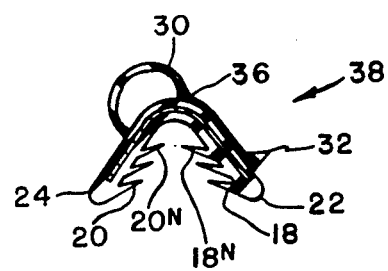
FIG. 3 is a structural view of the complete seal including the bulb on the carrier taken along line 3—3 of FIG. 1.

The co-extrusion die 10 has a second supply of rubber 28 which is extruded as a bulb 30 adjacent apex 36 and arm 24 and a projection 32 on arm 22 to produce seal 38 as shown in FIG. 3.

On exiting from the co-extrusion die 10, seal 38 goes through curing oven 27 where the rubber is cured.

Figure 4:
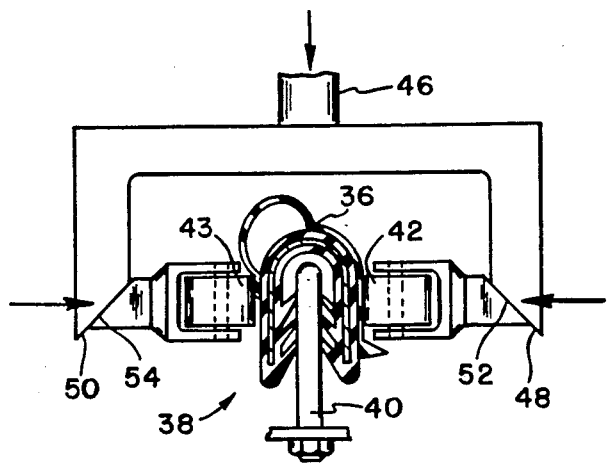
FIG. 4 is a schematic illustration of an apparatus through which the metal insert in the carrier is formed into a U-shape.

Seal 38 on coming from the curing oven 27 is pulled through side forming rollers 42 and 44 as shown in FIG. 4. Rollers 42 and 44 act on arms 22 and 24 to establish a U-shape for carrier 18. Side forming rollers 42 and 44 act on arms 22 and 24 by the action of press 46 moving in vertical direction and causing wedges 48 and 50 to provide a corresponding horizontal movement to wedges 52 and 54. The spatial distance between side forming rollers 42 and 44 define the final distance between arms 22 and 24 to establish a desired U-shape.

Figure 5:
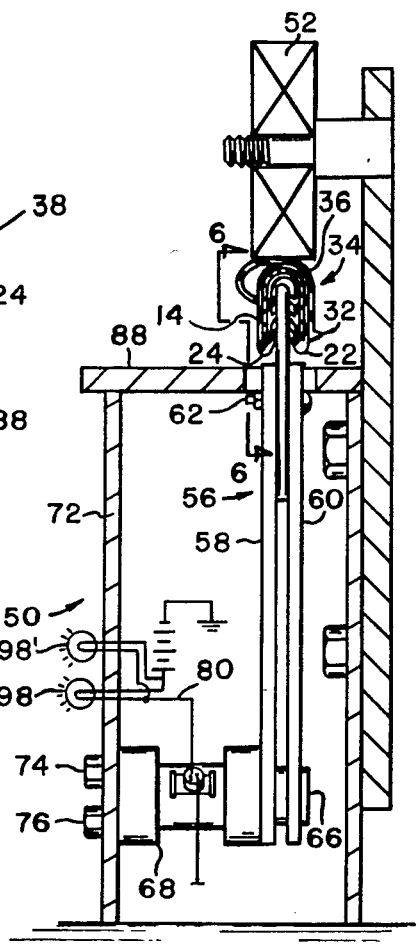
FIG. 5 is a sectional view of a torque transducer for monitoring the resistance to movement of a carrier with respect to a probe.

After the rubber is cured in the oven 27, the seal 38 is carried to a station 39 where a control apparatus 50, illustrated in FIG. 5, monitors the relationship between the first and second arms 22 and 24, the internal gripping fingers 18 and 20, and how they are combined to create a measurable drag.

Control apparatus 50 has a roller 52 which engages the apex 36 of seal 38 to hold fingers 18, 18' ... $18^N$ and 20, 20' ... $20^N$ in engagement with rods 54, 54' ... $54^N$ on the end of lever 56.

Figure 6:
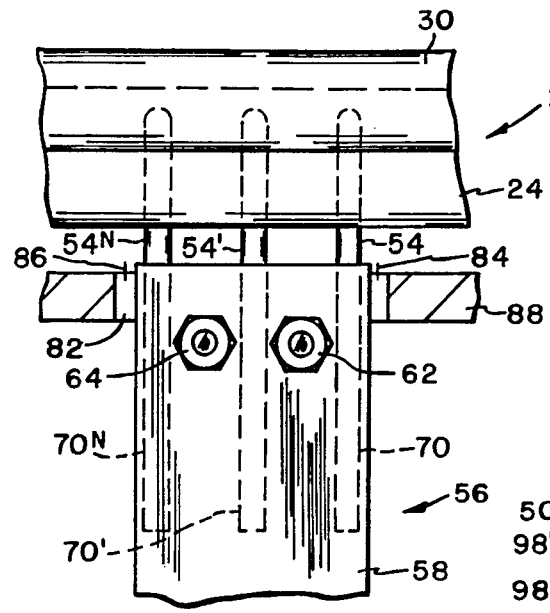
FIG. 6 is a view taken along line 6—6 of FIG. 5 showing a probe inserted into the U-shaped carrier.

Lever 56 is made up of first and second members 58 and 60 which have one end connected together by bolts 62 and 64 and the other end located on shaft 66 of a torque transducer 68. Grooves 70, 70' ... $70^N$ (best shown in FIG. 6) are located on the first and second members 58 and 60 to align rods 54, 54' and $54^N$ in parallel with lever 56.

Transducer 68 which is fixed to housing 72 by bolts 74 and 76 holds lever 56 in the center of opening 82. Lead 80 connects transducer 68 to monitor system and indicator lights 98 and 98' and/or to the control system for the extrusion apparatus 26.

MODE OF OPERATION OF THE INVENTION

Rubber from extruder 12, steel from roll 16 and foam rubber from extruder 28 are simultaneously feed into the co-extrusion die 10 where the carrier 18 and sealing bulb 30 are co-extruded to produce seal 38.

Seal 38 is pulled by tracks 11 and 13 through a pair of opposed pinch rollers 42 and 44 that form a carrier 19 into its final U-shape.

Thereafter, seal 38 is pulled over fingers 54, 54' ... $54^N$ bringing tabs 18 and 20 into engagement with fingers 54, 54' ... $54^N$. The resistance to movement of seal 38 is carried through lever 56 to torque transducer 68. Input from transducer 68 is carried to a control system which can be designed to provide a signal to monitor and alarm an out of tolerance condition, or to position press 46 to maintain the rollers 42 and 44 in a variable location to maintain the relationship between arms 22 and 24 and fingers 20 and 18, and thus control the insertion-removal characteristic of the carrier.

If the arms 22 and 24 are too close together, the frictional resistance to movement over fingers 54, 54' ... $54^N$ causes lever 56 to bend away from the center of opening 82 causing transducer 68 to correspondingly provide the control system with an operation input. The operational signal causes light 98 to be activated to provide a visual indication that the carrier assembly is over tolerance.

Similarly, should arms 22 and 24 be too far apart, the frictional resistance on the lever 56 will be reduced. In this condition, light 98' is activated to provide a visual indication of the carrier assembly being under tolerance. Again, either the control system automatically or an operator manually, provides an input to move rollers 42 and 44 and modify the relationship between arms 22 and 24.

Figure 7:
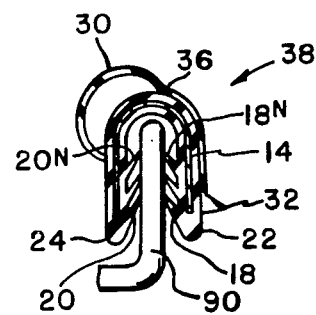
FIG. 7 is a sectional view of the seal inserted on a projection.

Seal 38 is shown in FIG. 7 is installed on a projection 90 that surrounds an opening. As shown, tabs 18 and 20 engage projection 90 and frictionally retains the carrier 18 on the projections 90. With the on-line monitoring of the extrusion and forming apparatus 26, the insertion and removal forces required to install and remove a seal 38 on projection 90 is maintained within set limits.

After a set time period of use, seal 38 will wear the fingers 54, 54' ... $54^N$ of the monitor at station 39. Bolts 62 and 64 are loosened and the fingers 54, 54' ... $54^N$ reversed to assure that the relationship is maintained between arms 22 and 24 and the insertion-removal characteristic is in tolerance.

Figure 8:
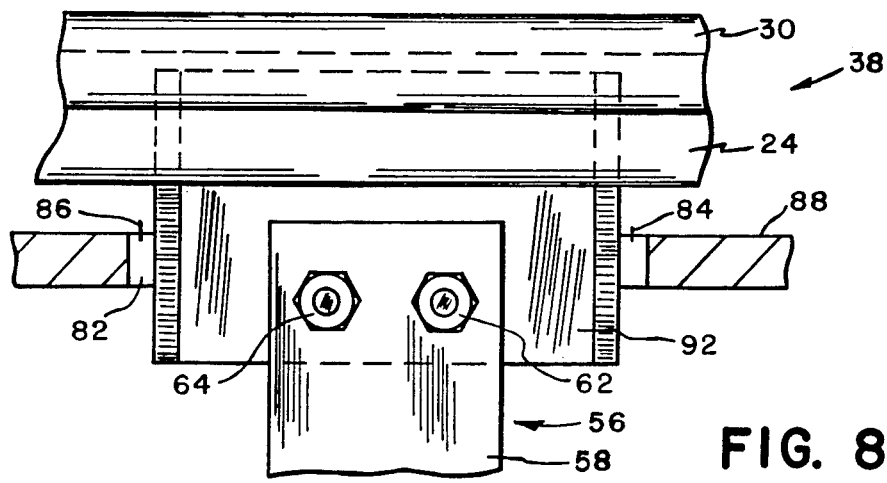
FIG. 8 is a view of a second blade type probe for insertion into the U-shaped carrier.

In the monitor device 50 shown in FIG. 8, a blade 92 is attached to lever 56 to replace fingers 54, 54' ... $54^N$. Carrier 18 of seal 38 is drawn over blade 92 to provide transducer 68 with an input indicative of the relationship between arms 22 and 24, and indication of the insertion-removal characteristic of a carrier 19 on a projection.

It is recognized that the torque transducer 68 could be replaced with a beam having a first end fixed to a support and a second end located in the U-shaped carrier 19. A strain gage attached to the beam measures the deflection caused by the resistance to movement of the carrier 19 over the second end.

Similarly, a monitor could be made of a probe attached to a bar having a first end fixed to a support. As the carrier 19 engages the probe, linear expansion is imported in the bar as a function of the resistance to movement. A strain gage fixed to the bar provides an operational signal corresponding to the linear expansion. This operational signal is a function of the insertion-retraction of the carrier 19 on a projection 90.

I claim:

1. In combination with an extrusion apparatus for manufacturing a seal having a rubber carrier with a metal insert that extends between first and second legs, said first and second legs having gripping fingers on the inside surface, said carrier being manipulated by a forming member to bring said first and second legs into a U-shape, said U-shape defining a desired predetermined relationship between said first and second legs and the internal gripping fingers to establish acceptable insertion-removal characteristic with respect to a projection, the improvement comprising:

sensor means for engaging said carrier to monitor the relationship between said first and second legs and gripping fingers as a function of the frictional resistance to movement of the carrier with respect to the sensor means.

2. In the combination as recited in claim 1, wherein said sensor means includes:

a probe attached to a lever arm, said probe contacting said first and second legs; and a torque transducer having a shaft, said lever arm being located on said shaft, said resistance to movement being transmitted through said lever arm into said torque transducer developing a signal corresponding to said frictional resistance.

3. The combination as recited in claim 2, wherein said sensor means includes:

indicator means to provide a visual indication of said resistance to movement.

4. The combination as recited in claim 3, wherein said sensor means includes:

feedback means connected to a system to automatically adjust variables in the process to maintain said relationship and the insertion-removal characteristics substantially constant.

5. A method of monitoring and controlling the relationship between first and second arms and the insertion-removal characteristics of a carrier member of a seal manufactured by an extrusion apparatus comprising the steps:

transporting said seal to a station where a metal insert in said carrier is formed into a U-shape; and sensing said U-shape with a probe engagement to define the frictional resistance of said carrier with respect to said probe; and activating an indicator if the sensed frictional resistance is outside of a preselected acceptance range.

6. The method as recited in claim 5 wherein said sensing step is achieved through the deformation of a lever to provide a tranducer with an input signal.

7. The method as recited in claim 6 further including the step of:

modifying the forming of the carrier to maintain the U-shape within set parameters.